United States Patent
Seo et al.

(10) Patent No.: US 11,493,807 B2
(45) Date of Patent: Nov. 8, 2022

(54) SUBSTRATE

(71) Applicant: LG Chem, Ltd., Seoul (KR)

(72) Inventors: Han Min Seo, Daejeon (KR); Ji Young Hwang, Daejeon (KR); Cheol Ock Song, Daejeon (KR); Nam Seok Bae, Daejeon (KR); Seung Heon Lee, Daejeon (KR); Dong Hyun Oh, Daejeon (KR); Jung Sun You, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/722,916

(22) Filed: Dec. 20, 2019

(65) Prior Publication Data

US 2020/0124894 A1    Apr. 23, 2020

Related U.S. Application Data

(63) Continuation of application No. PCT/KR2018/007390, filed on Jun. 29, 2018.

(30) Foreign Application Priority Data

Jun. 30, 2017 (KR) .................... 10-2017-0083496

(51) Int. Cl.
    *G02F 1/1339*      (2006.01)
    *G02F 1/1337*      (2006.01)

(52) U.S. Cl.
    CPC ........ *G02F 1/13392* (2013.01); *G02F 1/1337* (2013.01); *G02F 1/13394* (2013.01)

(58) Field of Classification Search
    CPC ............. G02F 1/13392; G02F 1/13394; G02F 1/1337; G02F 1/1339
    See application file for complete search history.

(56) References Cited

U.S. PATENT DOCUMENTS 6,097,467 A * 8/2000 Fujimaki ............. G02F 1/13394
    349/155
6,638,781 B1 * 10/2003 Hirakata ............. H01L 27/1222
    438/30

(Continued)

FOREIGN PATENT DOCUMENTS

CN      202404338 U    8/2012
CN      202502301 U    10/2012

(Continued)

OTHER PUBLICATIONS

ISR for Application PCT/KR2018/007390 dated Oct. 16, 2018, 2 pages.

(Continued)

*Primary Examiner* — Jia X Pan
(74) *Attorney, Agent, or Firm* — Lerner, David, Littenberg, Krumholz & Mentlik, LLP

(57) ABSTRACT

A substrate on which a specific type spacer is formed, a substrate comprising an alignment film formed on the spacer, and an optical device using such a substrate are disclosed herein. By controlling the shape of the spacer formed on the substrate, even when the alignment film is formed on the top of the spacer and the orientation treatment is performed, the uniform orientation treatment can be performed without any influence by the step or the like of the spacer, whereby a substrate or the like capable of providing a device having excellent optical performance can be provided.

14 Claims, 13 Drawing Sheets

(56) References Cited

U.S. PATENT DOCUMENTS

| | | | |
|---|---|---|---|
| 6,724,457 B1* | 4/2004 | Sunohara | G02F 1/13394 |
| | | | 349/155 |
| 2002/0063834 A1 | 5/2002 | Sawasaki et al. | |
| 2005/0012889 A1 | 1/2005 | Ishii et al. | |
| 2006/0229376 A1 | 10/2006 | Hayashi et al. | |
| 2008/0252841 A1* | 10/2008 | Funahata | G02F 1/13394 |
| | | | 349/155 |
| 2010/0118254 A1* | 5/2010 | Hashimoto | G02F 1/13394 |
| | | | 349/155 |
| 2010/0171106 A1 | 7/2010 | Jung et al. | |
| 2011/0141428 A1 | 6/2011 | Maruyama et al. | |
| 2012/0050653 A1* | 3/2012 | Nagata | G02F 1/13394 |
| | | | 349/110 |
| 2012/0236237 A1* | 9/2012 | Kanari | G02B 30/27 |
| | | | 349/110 |
| 2014/0354930 A1 | 12/2014 | Hirato et al. | |
| 2015/0109553 A1* | 4/2015 | Kubota | H01L 27/1225 |
| | | | 349/46 |
| 2015/0198835 A1 | 7/2015 | Kwon et al. | |
| 2015/0234224 A1 | 8/2015 | Jang et al. | |
| 2015/0362741 A1 | 12/2015 | Oh et al. | |
| 2016/0282658 A1 | 9/2016 | Hirakata et al. | |
| 2017/0059876 A1 | 3/2017 | Kim | |
| 2017/0293175 A1 | 10/2017 | Lin | |
| 2018/0321535 A1 | 11/2018 | Kim et al. | |

FOREIGN PATENT DOCUMENTS

| | | | |
|---|---|---|---|
| CN | 204331232 U | | 5/2015 |
| CN | 105093709 A | | 11/2015 |
| CN | 106483670 A | | 3/2017 |
| EP | 0022311 A1 | | 1/1981 |
| GN | 102681180 A | | 9/2012 |
| GN | 103959154 A | | 7/2014 |
| JP | 2000267114 A | | 9/2000 |
| JP | 2006184505 A | | 7/2006 |
| JP | 2007240599 A | | 9/2007 |
| JP | 2008203854 A | | 9/2008 |
| JP | 2009048052 A | | 3/2009 |
| JP | 20090181063 A | | 8/2009 |
| JP | 2011081318 A | | 4/2011 |
| JP | 2012194257 A | | 10/2012 |
| KR | 100269196 B1 | | 10/2000 |
| KR | 20050064272 A | | 6/2005 |
| KR | 100796492 B1 | | 1/2008 |
| KR | 20100081773 A | | 7/2010 |
| KR | 100974692 B1 | | 8/2010 |
| KR | 20120105357 A | | 9/2012 |
| KR | 20130039383 A | | 4/2013 |
| KR | 20150083956 A | | 7/2015 |
| KR | 20170058845 A | | 5/2017 |
| TW | 200500687 A | | 1/2005 |
| WO | 2017086590 A1 | | 5/2017 |

OTHER PUBLICATIONS

Extended European Search Report including Written Opinion for Application No. EP18824235.8 dated May 7, 2020, pp. 1-12.
Search Report dated May 9, 2022 from Office Action from Chinese Application No. 201880039546.4 dated May 16, 2022. 3 pgs. (see p. 1-2, categorizing the cited references).

* cited by examiner

[Figure 1]
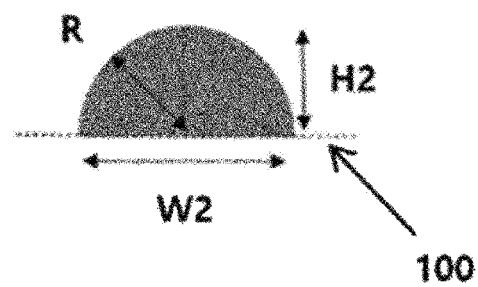
[Figure 2]
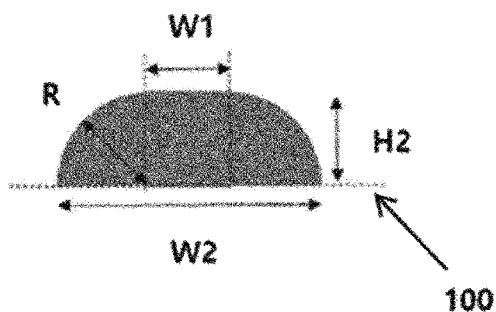
[Figure 3]
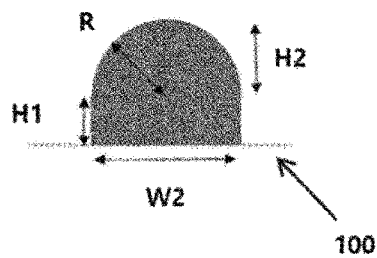

[Figure 4]
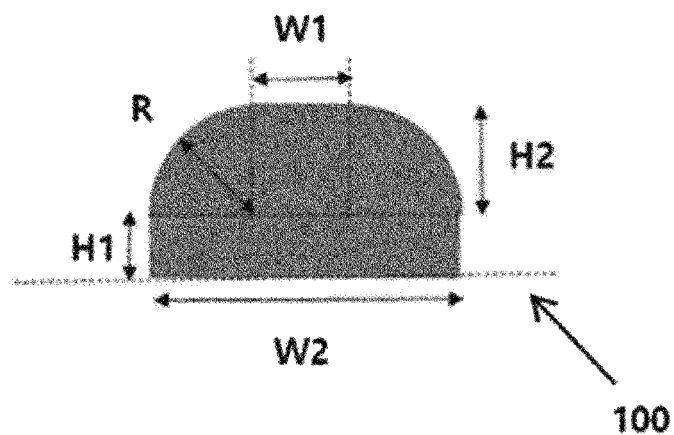
[Figure 5]
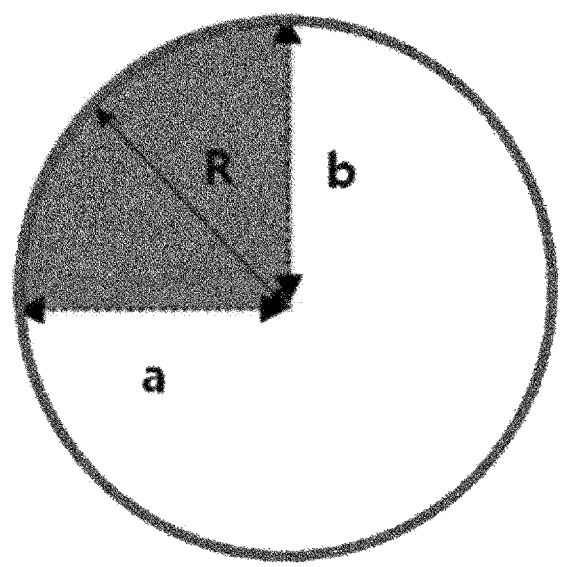

[Figure 6]
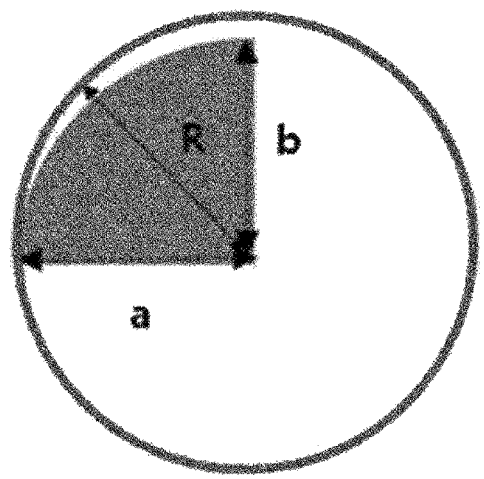
[Figure 7]
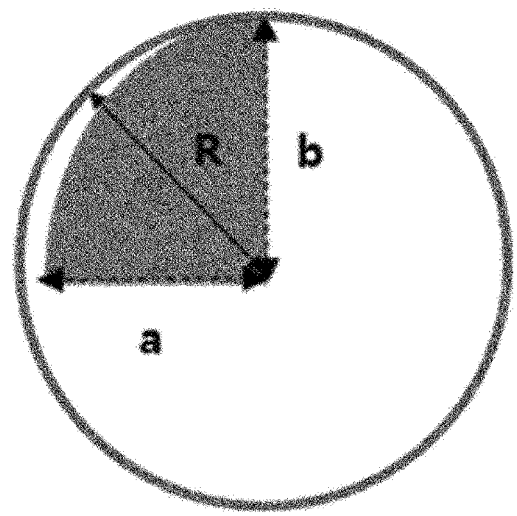

[Figure 8]
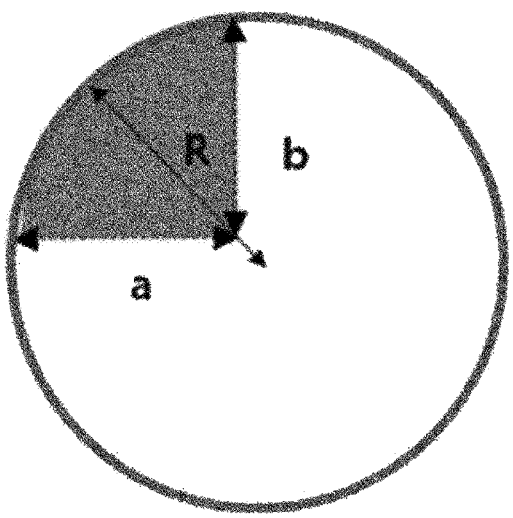
[Figure 9]
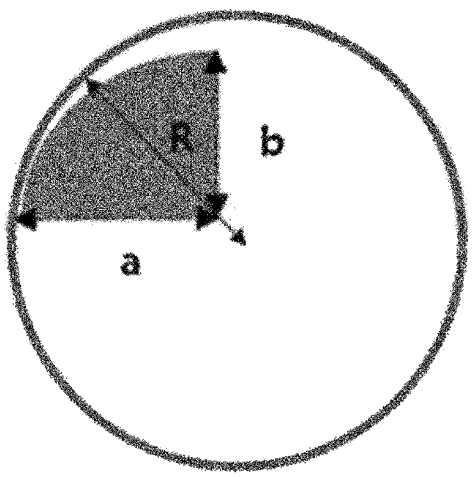

[Figure 10]
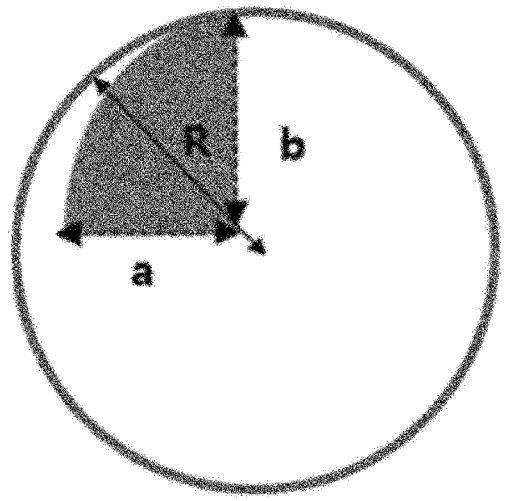
[Figure 11]
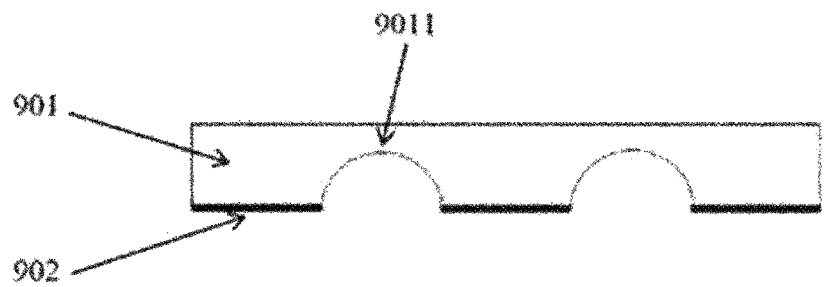
[Figure 12]
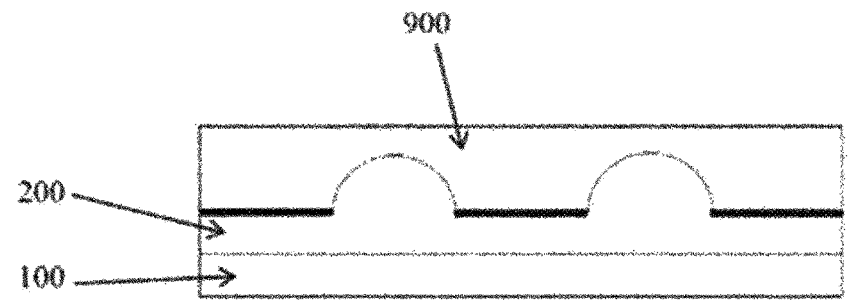

[Figure 13]
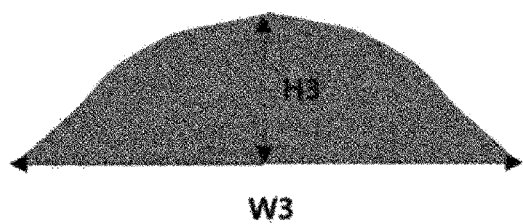
[Figure 14]
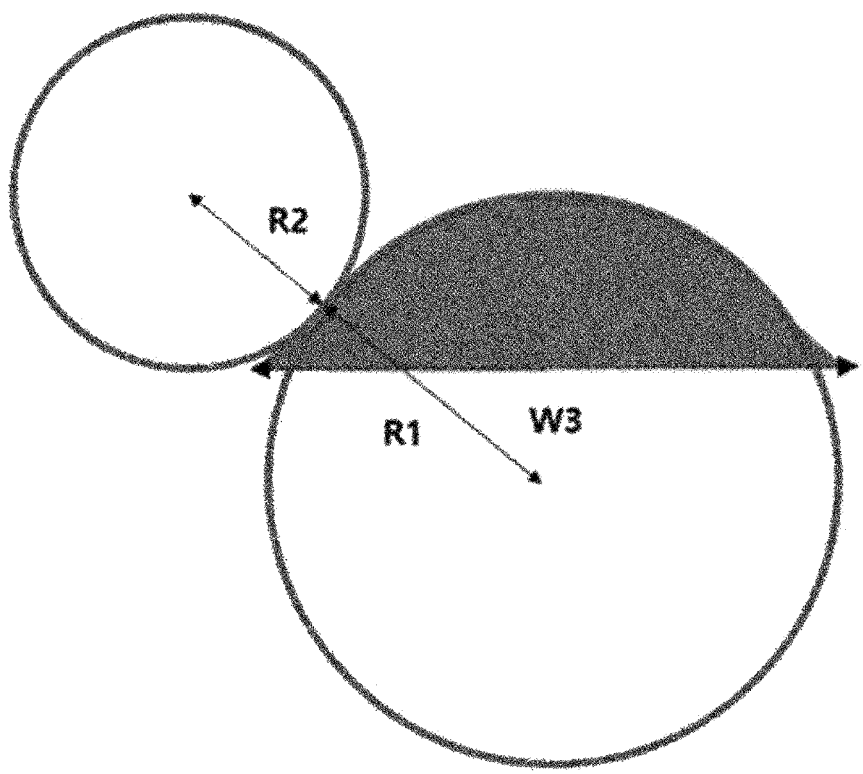

[Figure 15]
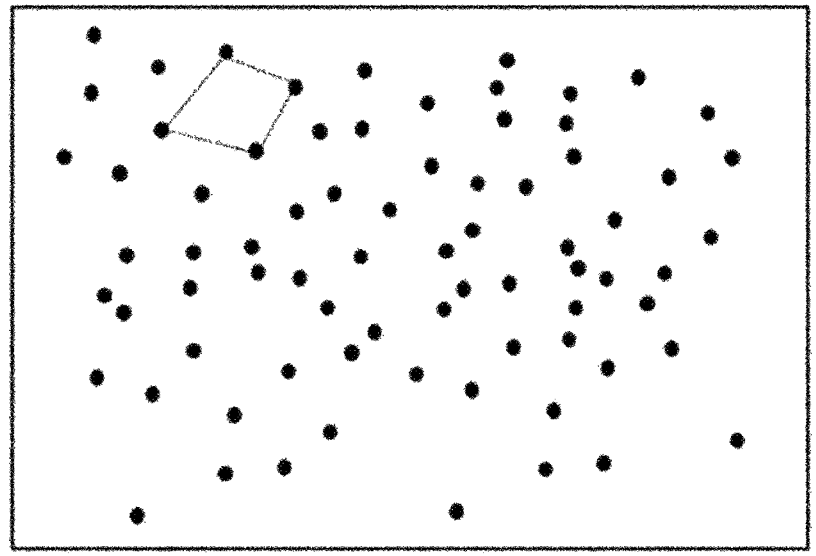
[Figure 16]
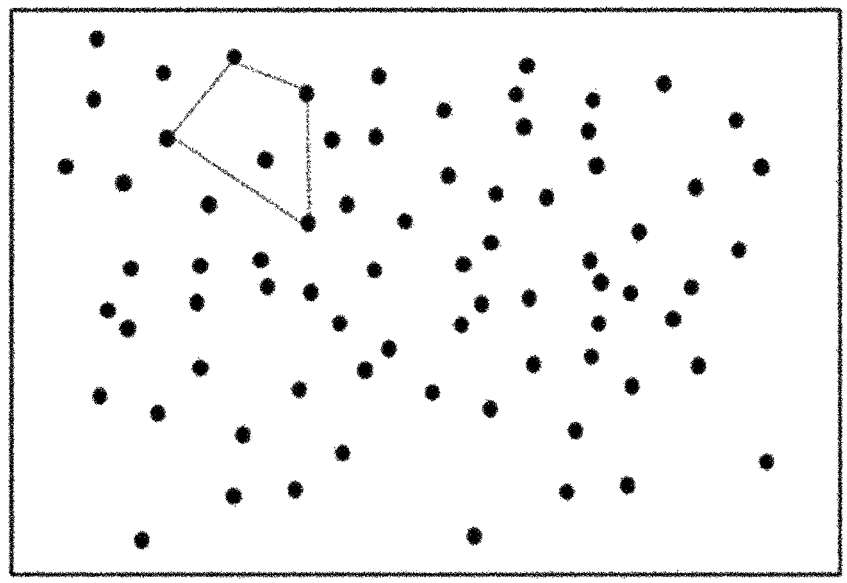

[Figure 17]
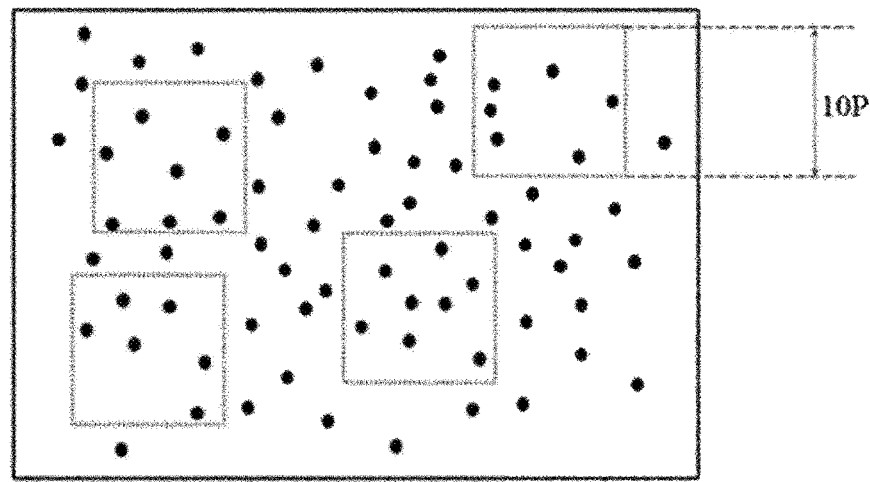
[Figure 18]
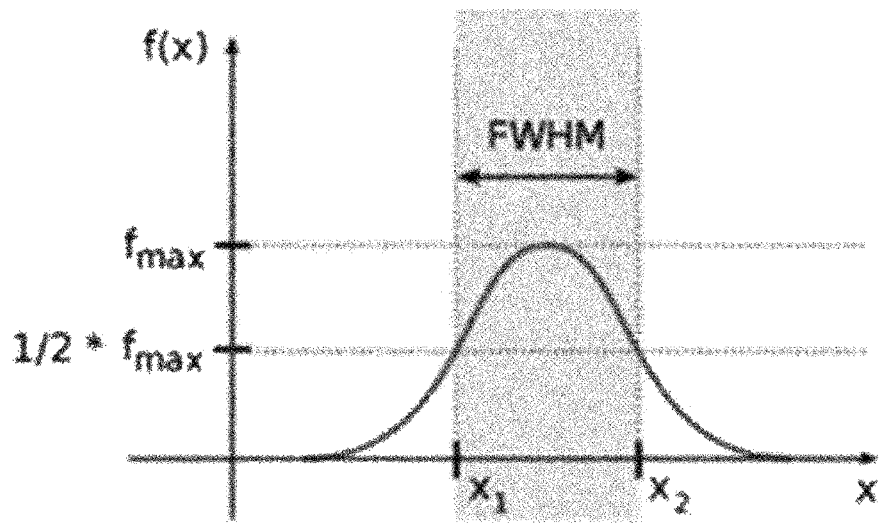

[Figure 19]
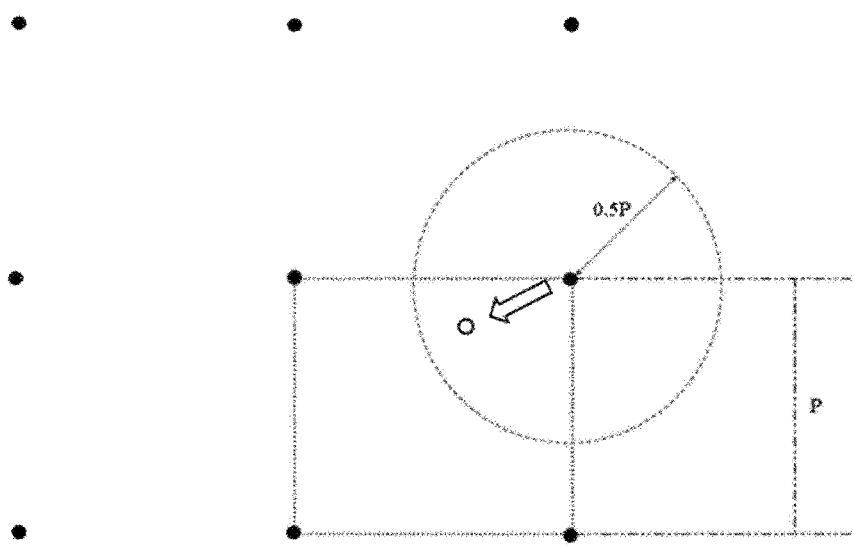

[Figure 20]

[Figure 21]
[Figure 22]
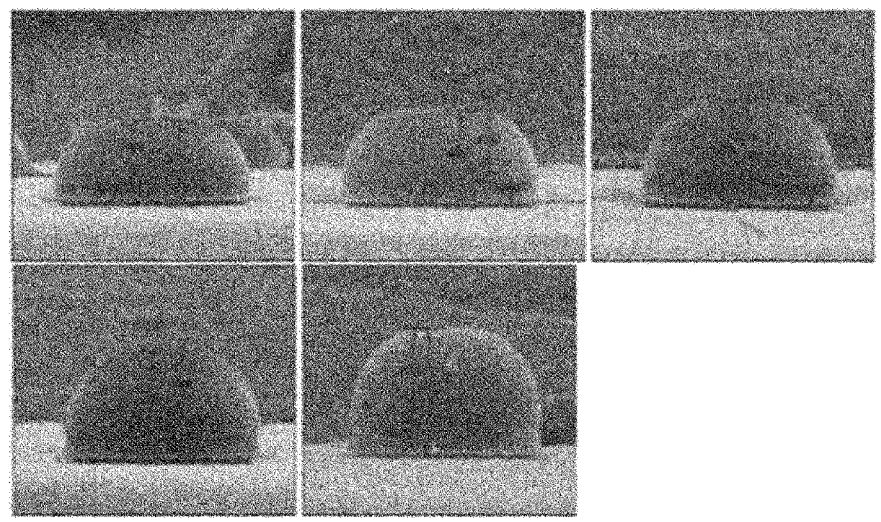

[Figure 23]
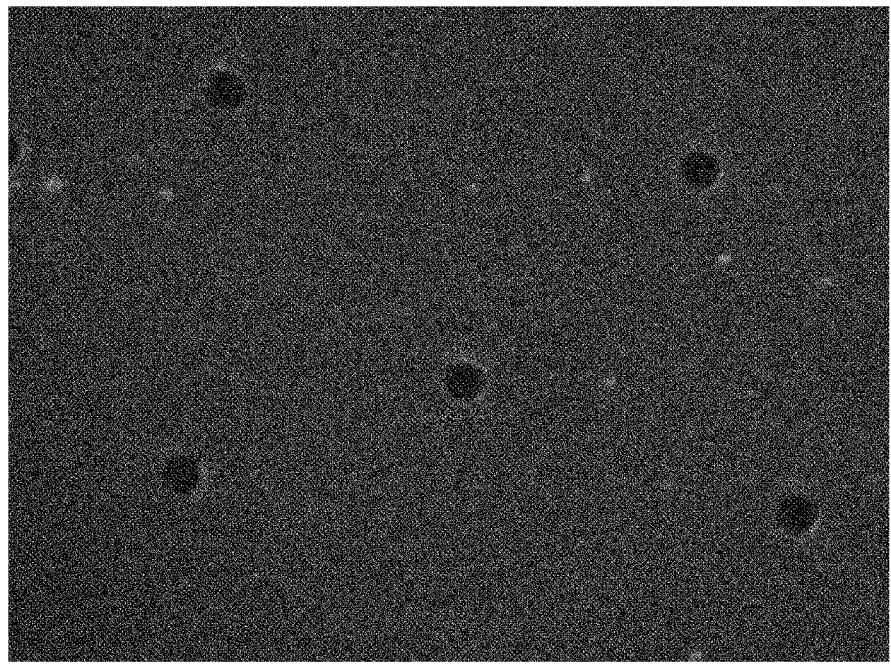
[Figure 24]
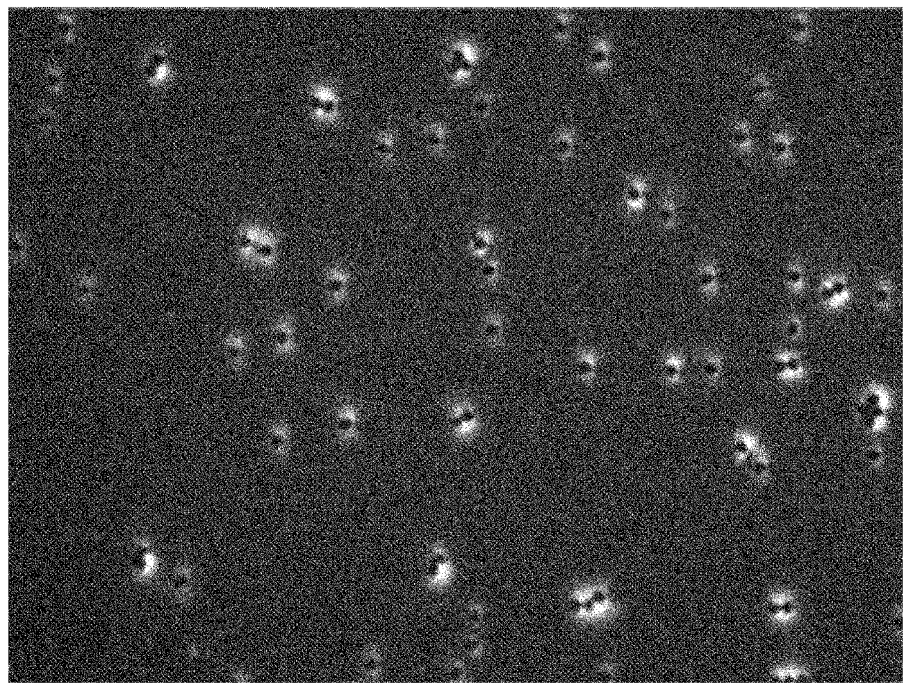

[Figure 25]
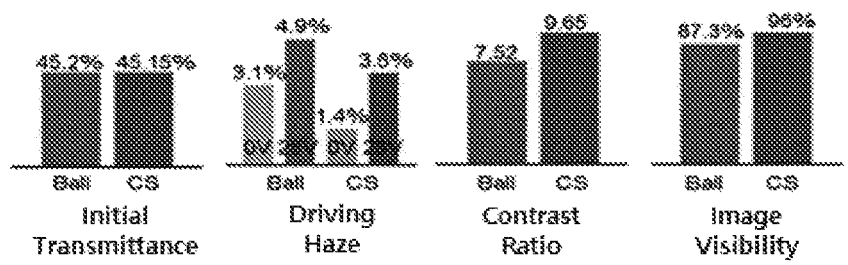

SUBSTRATE

CROSS-REFERENCE TO RELATED APPLICATION(S)

The present application is a continuation of International Application No. PCT/KR2018/007390, filed on Jun. 29, 2018, which claims priority from Korean Patent Application No. 10-2017-0083496, filed on Jun. 30, 2017, the disclosures of which are incorporated by reference herein.

TECHNICAL FIELD

The present application relates to a substrate.

BACKGROUND ART

An optical device capable of adjusting light transmittance or colors by disposing a liquid crystal compound or a mixture of a liquid crystal compound and a dye, and the like between two substrates disposed opposite to each other is known. For example, Patent Document 1 discloses a so-called GH cell (guest host cell) applying a mixture of a liquid crystal host and a dichroic dye guest.

In such a device, so-called spacers are located between the two substrates to maintain the spacing between the substrates.

PRIOR ART DOCUMENTS

Patent Documents

Patent Document 1: European Patent Publication No. 0022311

BRIEF DESCRIPTION OF DRAWINGS

FIGS. 1 to 4 are schematic diagrams of forms of spacers of the present application.

FIGS. 5 to 10 are diagrams for explaining forms of spacers of the present application.

FIG. 11 is a diagram showing a shape of a mask that can be used for manufacturing a spacer of the present application, according to one example.

FIG. 12 is a schematic diagram of a process of manufacturing a spacer using the mask shown in FIG. 11.

FIGS. 13 and 14 are schematic diagrams of cross sections of alignment films formed on spacers.

FIGS. 15 to 17 are diagrams for explaining pitches between spacers.

FIG. 18 is an example of a distribution diagram of spacers.

FIG. 19 is a diagram for explaining a method of implementing a degree of irregularity.

FIGS. 20 and 22 are photographs showing shapes of spacers manufactured in Examples, FIG. 21 is a photograph showing the case where an alignment film is formed on the spacers of FIG. 20.

FIGS. 23 to 25 are diagrams comparing the performance of the devices of Example 7 and Comparative Example 1.

DISCLOSURE

Technical Problem

The present application provides a substrate, for example, a substrate comprising a spacer or a substrate on which an alignment film is formed on the spacer of the substrate.

Technical Solution

The substrate of the present application comprises a base layer and a spacer present on the base layer.

As the base layer, for example, any base layer used in a substrate in a configuration of a known optical device such as an LCD (liquid crystal display) can be applied without particular limitation. For example, the base layer may be an inorganic base layer or an organic base layer. As the inorganic base layer, a glass base layer or the like can be exemplified, and as the organic base layer, various plastic films or the like can be exemplified. The plastic film can be exemplified by a TAC (triacetyl cellulose) film; a COP (cycloolefin copolymer) film such as a norbornene derivative; an acrylic film such as PMMA (poly(methyl methacrylate); a PC (polycarbonate) film; a polyolefin film such as PE (polyethylene) or PP (polypropylene); a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethyleneterephtalate) film; a PI (polyimide) film; a PSF (polysulfone) film or a PAR (polyarylate) film, and the like, but is not limited thereto.

In the substrate of the present application, the thickness of the base layer is also not particularly limited, where an appropriate range may be selected depending on applications.

A spacer is present on the base layer. The spacer may be fixed to the base layer. In this case, the spacer may be fixed directly in contact with the base layer, or if there are other layers between the base layer and the spacer, it may be fixed on the relevant other layer. The kind of the other layer includes a known layer necessary for driving the optical device, and for example, an electrode layer or a light-shielding layer, and the like, which is described below, can be exemplified.

The spacer includes a curved portion. The spacer may be a hemispherical spacer, where the curved portion is a hemispherical portion. The curved portion is formed at least at the top end of the spacer. By applying the spacer having such a curved portion, even when orientation treatment such as rubbing orientation or photo-orientation is performed after an alignment film is formed on the base layer on which the spacer is formed, the uniform orientation treatment can be performed even in the region where the spacer exists without influence of the step by the spacer. Accordingly, the optical device to which the substrate of the present application is applied can exhibit uniform optical performance.

In the present application, the term curved portion may mean a part of the spacer including a curved shape in which the trajectory of the cross section has a predetermined curvature. In addition, the trajectory of the cross section of the curved portion may include a curved part where the center of curvature is present inside the cross-sectional trajectory.

In one example, the curved portion may have a maximum curvature of the cross-sectional trajectory of 2,000 mm$^{-1}$ or less. As is known, the curvature is a numerical value representing a degree of curvature of a line, which is defined as an inverse number of a radius of curvature which is a radius of a contact circle at a predetermined point of the relevant curve. In the case of a straight line, the curvature is 0, and the larger the curvature, the more curved the curve exists.

By controlling the degree of bending of the curved portion so that the maximum curvature of the cross-sectional trajectory of the curved portion is 2,000 mm$^{-1}$ or less, the uniform orientation treatment can be performed even when the orientation treatment of the alignment film is performed at the top of the curved portion. Here, the cross section for confirming the cross-sectional trajectory of the curved portion may be any normal plane for the base layer. In addition, the maximum curvature may mean the largest curvature among the curvatures for all the contact circles that can be obtained on the cross-sectional trajectory of the curved portion. In other words, the cross-sectional trajectory of the curved portion may not include the bent portion such an extent that the curvature exceeds 2,000 mm$^{-1}$.

In another example, the maximum curvature may be 1,800 mm$^{-1}$ or less, 1,600 mm$^{-1}$ or less, 1,400 mm$^{-1}$ or less, 1,200 mm$^{-1}$ or less, 1,000 mm$^{-1}$ or less, 900 mm$^{-1}$ or less, 950 mm$^{-1}$ or less, 800 mm$^{-1}$ or less, 750 mm$^{-1}$ or less, 700 mm$^{-1}$ or less, 650 mm$^{-1}$ or less, 600 mm$^{-1}$ or less, 550 mm$^{-1}$ or less, 500 mm$^{-1}$ or less, 450 mm$^{-1}$ or less, 400 mm$^{-1}$ or less, 350 mm$^{-1}$ or less, 300 mm$^{-1}$ or less, 250 mm$^{-1}$ or less, 200 mm$^{-1}$ or less, or 150 mm$^{-1}$ or less or so. In another example, the maximum curvature may be 5 mm$^{-1}$ or more, 10 mm$^{-1}$ or more, 15 mm$^{-1}$ or more, 20 mm$^{-1}$ or more, 25 mm$^{-1}$ or more, 30 mm$^{-1}$ or more, 40 mm$^{-1}$ or more, 45 mm$^{-1}$ or more, or 50 mm$^{-1}$ or more.

The cross-sectional trajectory of the curved portion may or may not include a portion having curvature of 0, that is, a linear portion.

For example, FIG. 1 is an example of a cross-sectional trajectory of a curved portion (e.g., a hemispherical portion) that does not include a portion having curvature of 0, and FIG. 2 is an example of a cross-sectional trajectory of a curved portion including a portion having curvature of 0.

The spacer comprises the curved portion as above at least at the top end of the spacer. In this specification, the term top end means the end of the spacer farthest from the base layer toward the spacer formed on the base layer, and the bottom end means the end of the spacer closest to the base layer.

The spacer may be formed in various shapes as long as it comprises the hemispherical portion. For example, the spacer may be a shape in which the curved portion is directly formed on the surface of the base layer (100), as shown in FIG. 1 or 2, or may be a columnar spacer including the curved portion at the top end, as shown in FIG. 3 or 4.

In addition, in the curved portion of the spacer, the cross-sectional trajectory may not include a portion having curvature of 0, as shown in FIG. 1 or 3, or the cross-sectional trajectory may also include a portion (a flat surface at the top end) having curvature of 0, as shown in FIG. 2 or 4. Hereinafter, for convenience, the curved portion of the same shape as that of a hemisphere in FIG. 1 or 3 may be referred to as a hemispherical portion, and the curved portion having a shape in which a flat surface is formed on the top end of the spacer in FIG. 2 or 4 may be referred to as a curved portion including flat portion.

In FIGS. 1 to 4, H2 is the height of the curved portion, R is the radius of curvature of the curved portion, W1 is the length (width) of the flat surface of the flat portion, W2 is the width of the spacer, H1 is the value obtained by subtracting the height (H2) of the curved portion from the total height of the spacer.

The curved portion may be a complete hemispherical shape or may be one having an approximately hemispherical shape. The complete hemispherical shape may be a hemispherical shape satisfying Relational Expression 1 to be described below, and the approximate hemispherical shape may be a hemispherical shape satisfying any one of Relational Expressions 2 to 4 below.

The curved portion may have a shape in which the cross-sectional shape satisfies any one of Relational Expressions 1 to 4 below.

$a=b=R$         [Relational Expression 1]

$a \neq b=R$ or $b \neq a=R$         [Relational Expression 2]

$a=b<R$         [Relational Expression 3]

$a \neq b<R$         [Relational Expression 4]

In Relational Expressions 1 to 4, a is the horizontal length of the curved portion section measured at the center of the virtual contact circle of the curved portion section, b is the vertical length of the curved portion section measured at the center of the virtual contact circle of the curved portion section, and R is the curvature radius of the virtual contact circle of the curved portion section.

The curvature radius in Relational Expressions 1 to 4 corresponds to the length indicated by R in FIGS. 1 to 4.

In Relational Expressions 1 to 4, the virtual contact circle may mean a contact circle having the largest curvature radius among a plurality of virtual contact circles in contact with the curved line forming the curved portion.

If the curved portion is the complete hemispherical shape as shown in FIGS. 1 and 3, the cross section of the curved portion as a whole is a curved line, and thus a contact circle having the largest curvature radius among a plurality of virtual contact circles in contact with any point of the relevant curved line may be a contact circle as referred to in Relational Expressions 1 to 4. In addition, if the curved portion includes a flat portion as shown in FIGS. 2 and 4, a contact circle having the largest curvature radius among a plurality of virtual contact circles in contact with any point of both side curved lines excluding the flat line on the top in the curved portion section becomes a virtual contact circle as referred to in Relational Expressions 1 to 4.

In Relational Expressions 1 to 4, the horizontal length is a length measured in a direction horizontal to the base layer surface (Reference Numeral 100 in FIGS. 1 to 4) at the center point of the virtual contact circle, and the vertical length is a length measured in a direction vertical to the base layer surface (Reference Numeral 100 in FIGS. 1 to 4).

Therefore, in Relational Expressions 1 to 4, a is the length from the center of the virtual contact circle of the curved portion section to the point where the curved portion is terminated as measured while proceeding in the horizontal direction. This horizontal length may have two lengths of a length from the center of the virtual contact circle as measured while proceeding in the rightward direction and a length measured while proceeding in the leftward direction, where a applied in Relational Expressions 1 to 4 means a short length of the two lengths. In the case of the curved portion having a shape of FIGS. 1 and 3, the horizontal length (a) is a value corresponding to ½ of the width (W2) of the spacer. Also, in the case of FIGS. 2 and 4, the value (2a+W1) obtained by adding the length (width) (W1) of the flat portion to twice the horizontal length (a) may correspond to the width (W2) of the spacer.

In Relational Expressions 1 to 4, b is the length from the center of the virtual contact circle of the hemispherical portion section to the point where the curved portion first meets while proceeding in the vertical direction. Usually, this vertical length (b) may be approximately the same as the height of the hemispherical portion, for example, the length indicated by Symbol H2 in FIGS. 1 to 4.

FIG. 5 is a cross-sectional curve shape of the curved portion satisfying Relational Expression 1 above, which shows a case where the curved line of the curved portion has a complete circle curve, that is, a curve coinciding with the virtual contact circle.

Also, FIGS. 6 to 10 show approximate curve shapes of the curved portion satisfying any one of Relational Expressions 2 to 4.

A substrate, comprising a base layer and a spacer disposed on the base layer, wherein the spacer having a curved portion, wherein a cross section of the curved portion have at least one region having curvature and the spacer further comprising a tapered portion disposed on the surface of the base layer, wherein the curved portion is disposed on the tapered portion. In other words, the tapered portion, in which the cross-sectional trajectory is a curved shape that the curvature center is formed outside the cross section, may be formed at the bottom end of the spacer. With this form, an excellent effect according to the specific shape of the spacer of the present application, for example, achievement of the uniform orientation treatment or the like can be further improved.

The dimension of the spacer having the same shape as above is not particularly limited, which can be appropriately selected in consideration of, for example, a cell gap of the desired optical device or an aperture ratio, and the like.

For example, the height of the curved portion (H2 in FIGS. 1 to 4) may be in a range of 1 μm to 20 μm. In another example, the height may be 2 μm or more, 3 μm or more, 4 μm or more, 5 μm or more, 6 μm or more, 7 μm or more, 8 μm or more, 9 μm or more, 10 μm or more, or 11 μm or more. In another example, the height may also be 19 μm or less, 18 μm or less, 17 μm or less, 16 μm or less, 15 μm or less, 14 μm or less, 13 μm or less, 12 μm or less, or 11 μm or less.

In addition, the width of the curved portion (W2 in FIGS. 1 to 4) may be in a range of 2 μm to 40 μm. In another example, the width may be 4 μm or more, 6 μm or more, 8 μm or more, 10 μm or more, 12 μm or more, 14 μm or more, 16 μm or more, 18 μm or more, 20 μm or more, or 22 μm or more. In another example, the width may be 38 μm or less, 36 μm or less, 34 μm or less, 32 μm or less, 30 μm or less, 28 μm or less, 26 μm or less, 24 μm or less, or 22 μm or less.

When the spacer has the shape as shown in FIG. 1 or 2, the height of the spacer may be the same as the height of the curved portion, and when the spacer has the shape as shown in FIGS. 3 and 4, it may be a value obtained by adding the height (H1) of a columnar portion to the height of the hemispherical portion. In one example, the height may be in a range of 1 μm to 50 μm.

In another example, the height may be 3 μm or more, 5 μm or more, 7 μm or more, 9 μm or more, 11 μm or more, 13 μm or more, 15 μm or more, 17 μm or more, 19 μm or more, 21 μm or more, 23 μm or more, 25 μm or more, or 27 μm or more. In another example, the height may be 48 μm or less, 46 μm or less, 44 μm or less, 42 μm or less, 40 μm or less, 38 μm or less, 36 μm or less, 34 μm or less, 32 μm or less, 30 μm or less, 28 μm or less, or 26 μm or less.

By controlling the dimension of the spacer including or not including a columnar portion as above, the uniform orientation treatment can be performed even with respect to the alignment film formed on the top of the spacer and the uniform cell gap can be maintained, and thus when the substrate has been applied to production of an optical device, the performance of the relevant device can be excellently maintained.

The spacer can be formed using a known material. In one example, the spacer may be formed by comprising an ultraviolet curable resin. For example, it may be formed by curing an ultraviolet curable compound in a state where the shape of the ultraviolet curable compound is maintained in a state capable of forming a desired shape by an imprinting method to be described below, where the ultraviolet curable resin, which is a cured product of the ultraviolet curable compound, can form the spacer. The specific kind of ultraviolet curable compound that can be used for forming the spacer is not particularly limited, and for example, an acrylate-based polymer material or an epoxy-based polymer, and the like may be used, without being limited thereto.

In the present application, the manner of producing the spacer of the above-described type by applying such a material is not particularly limited. For example, the spacer may be manufactured by applying an imprinting method.

For example, the spacer can be manufactured by applying an imprinting mask as schematically shown in FIG. 11. The mask of FIG. 11 has a form that a concave hemispherical shape (9011) is formed on one surface of a light-transmissive, for example, ultraviolet-transmissive, main body (901), and the light-shielding film (902) is formed on a portion where the hemispherical shape is not formed on the surface of the main body (901) on which the hemispherical shape (9011) is formed. If necessary, the surface of the main body (901) on which the light-shielding film (902) is formed may be subjected to appropriate mold releasing treatment.

An exemplary process for producing the spacer using the mask having the same shape as above is shown in FIG. 12. As in FIG. 12, a layer (200) of an ultraviolet curable compound is first formed on a surface of the base layer (100) and the mask (900) is pressed on the layer (200). Then, if the layer (200) of the compound is cured by irradiating the top of the mask (900) with ultraviolet light or the like, the compound is cured according to the hemispherical shape formed on the mask (900) to form a spacer. Then, the spacer can be formed in the form fixed on the base layer (100) by removing the mask (900) and removing the uncured compound.

The desired spacer, such as a hemispherical or hemispherical columnar spacer, can be manufactured by adjusting the quantity of ultraviolet light to be irradiated, the degree of pressing of the mask and/or the hemispherical shape of the mask (900) and the like in the above process.

The substrate of the present application may comprise, in addition to the base layer and the spacers, other elements required for driving the optical device. These elements are variously known, and typically, there is an electrode layer or a light-shielding layer, and the like. In one example, the substrate may further comprise an electrode layer and/or a light-shielding layer between the base layer and the spacers. As the electrode layer, a known material can be applied. For example, the electrode layer may comprise a metal alloy, an electrically conductive compound or a mixture of two or more thereof. Such a material can be exemplified by a metal such as gold, CuI, an oxide material such as ITO (indium tin oxide), IZO (indium zinc oxide), ZTO (zinc tin oxide), zinc oxide doped with aluminum or indium, magnesium indium oxide, nickel tungsten oxide, ZnO, $SnO_2$ or $In_2O_3$, a metal nitride such as gallium nitride, a metal selenide such as zinc selenide, a metal sulfide such as zinc sulfide, or the like. A transparent positive hole injecting electrode layer can also be formed by using a laminate of a metal thin film of Au, Ag or Cu, and the like, and a transparent material having high refractive index such as ZnS, $TiO_2$ or ITO.

The electrode layer may be formed by any means such as vapor deposition, sputtering, chemical vapor deposition or electrochemical means. Patterning of the electrode layer is also possible in a known manner without any particular limitation, and the electrode layer may be patterned, for example, through known photolithography or a process using a shadow mask or the like.

As the light-shielding layer, a known material can also be applied, and for example, a generally-applied metal layer, a metal oxide layer, a metal nitride layer or a metal oxynitride layer, or a layer containing an organic pigment and/or an inorganic pigment can be exemplified.

The substrate of the present application may further comprise an alignment film present on the base layer and the spacer.

Thus, another exemplary substrate of the present application may comprise a base layer; a spacer present on the base layer; and an alignment film formed on the base layer and the spacer.

Here, the details of the base layer and the spacer are as described above.

In addition, the kind of the alignment film formed on the base layer and the spacers is not particularly limited, where a known alignment film, for example, a known rubbing alignment film or a photo-alignment film can be applied.

A method of forming the alignment film on the base layer and the spacers and performing orientation treatment thereon is also in accordance with a known method.

However, the alignment film may be formed on the spacer of the specific type as described above to have a unique shape as well. The shape of such an alignment film may have a shape that follows the shape of the spacer existing in the bottom. FIG. 13 is a diagram schematically showing the cross-sectional trajectory of the alignment film. FIG. 13 is an example of a cross-sectional shape of an alignment film formed on the spacer, where the top shows a curved shape in which the curvature center is formed on the inner side of the cross section while having predetermined width (W3) and height (H3).

For example, the alignment film may also comprise the above-described hemispherical portion on the top. In this case, the hemispherical portion may have a maximum curvature of the cross-sectional trajectory of 2,000 $mm^{-1}$ or less. In another example, the maximum curvature may be 1,800 $mm^{-1}$ or less, 1,600 $mm^{-1}$ or less, 1,400 $mm^{-1}$ or less, 1,200 $mm^{-1}$ or less, 1,000 $mm^{-1}$ or less, 950 $mm^{-1}$ or less, 900 $mm^{-1}$ or less, 850 $mm^{-1}$ or less, 800 $mm^{-1}$ or less, 750 $mm^{-1}$ or less, 700 $mm^{-1}$ or less, 650 $mm^{-1}$ or less, 600 $mm^{-1}$ or less, 550 $mm^{-1}$ or less, 500 $mm^{-1}$ or less, 450 $mm^{-1}$ or less, 400 $mm^{-1}$ or less, 350 $mm^{-1}$ or less, 300 $mm^{-1}$ or less, 250 $mm^{-1}$ or less, 200 $mm^{-1}$ or less, or 150 $mm^{-1}$ or less or so. In another example, the maximum curvature may be 5 $mm^{-1}$ or more, 10 $mm^{-1}$ or more, 15 $mm^{-1}$ or more, 20 $mm^{-1}$ or more, 25 $mm^{-1}$ or more, 30 $mm^{-1}$ or more, 40 $mm^{-1}$ or more, 45 $mm^{-1}$ or more, or 50 $mm^{-1}$ or more.

The cross-sectional trajectory of the curved portion of the alignment film may or may not include a portion having curvature of 0, that is, a linear portion.

The height and width of the alignment film formed on the spacer as above are also determined according to the height and width of the spacer existing on the bottom and the thickness of the formed alignment film, and the like, which are not particularly limited.

For example, the height of the curved portion (H3 in FIG. 13) may be in a range of 1 μm to 50 μm. In another example, the height may be 2 μm or more, 3 μm or more, 4 μm or more, 5 μm or more, 6 μm or more, 7 μm or more, 8 μm or more, 9 μm or more, 10 μm or more, or 11 μm or more. In another example, the height may also be 48 μm or less, 46 μm or less, 44 μm or less, 42 μm or less, 40 μm or less, 38 μm or less, 36 μm or less, 34 μm or less, 32 μm or less, 30 μm or less, 28 μm or less, 26 μm or less, 24 μm or less, 22 μm or less, 19 μm or less, 18 μm or less, 17 μm or less, 16 μm or less, 15 μm or less, 14 μm or less, 13 μm or less, 12 μm or less, or 11 μm or less.

Also, the width of the curved portion (W3 in FIG. 13) may be in a range of 1 μm to 80 μm. In another example, the width may be 2 μm or more, 3 μm or more, 4 μm or more, 6 μm or more, 8 μm or more, 10 μm or more, 12 μm or more, 14 μm or more, 16 μm or more, 18 μm or more, 20 μm or more, or 22 μm or more. In another example, the width may be 78 μm or less, 76 μm or less, 74 μm or less, 72 μm or less, 70 μm or less, 68 μm or less, 66 μm or less, 64 μm or less, 62 μm or less, 60 μm or less, 58 μm or less, 56 μm or less, 54 μm or less, 52 μm or less, 50 μm or less, 48 μm or less, 46 μm or less, 44 μm or less, 42 μm or less, 40 μm or less, 38 μm or less, 36 μm or less, 34 μm or less, 32 μm or less, 30 μm or less, 28 μm or less, 26 μm or less, 24 μm or less, or 22 μm or less.

As described above, in the case of the substrate of the present application, the orientation treatment of the alignment film formed on the spacer can be performed uniformly without being affected by the step of the spacer, by adjusting the shape of the spacer to a unique shape.

In order to maximize this effect, the shape of the alignment film can be further controlled.

For example, as the cross section of the alignment film is shown in FIGS. 13 and 14, a region facing upward from a point in contact with the substrate layer in the cross section of the alignment film may be a curved line shape in which the curvature center is formed outside the cross section. This shape can be formed, for example, in accordance with the shape of the spacer and the formation conditions of the alignment film. Accordingly, even when the orientation treatment such as rubbing treatment is performed on the alignment film, the uniform orientation treatment which is not affected by the step of the spacer can be performed.

The base layer may comprise a plurality of spacers by comprising, including the hemispherical spacer as mentioned above, the same or different spacers. Such a plurality of spacers may be disposed on the base layer while having predetermined regularity and irregularity simultaneously. Specifically, at least a part of the plurality of spacers on the base layer may be in an irregular arrangement in terms of being arranged so as to have pitches different from each other, but may be regular in terms of being arranged with substantially the same density between regions determined according to a predetermined rule.

That is, in one example, at least a part of the spacers disposed on the base layer may be disposed so as to have pitches different from each other.

Here, when a part of the plurality of spacers have been selected so as to form a closed figure in a state where other spacers are not present therein, the term pitch can be defined as a length of a side of the closed figure. In addition, unless otherwise specified, the unit of the pitch is μm.

The closed figure thus formed may be a triangle, a quadrangle or a hexagon. That is, when three spacers among the plurality of spacers have been optionally selected and connected to each other, the triangle is formed; when four spacers have been selected and connected to each other, the quadrangle is formed; and when six spacers have been selected and connected, the hexagon is formed.

FIG. 15 is an example of a quadrangle which is a closed figure formed by optionally selecting four spacers among the spacers (black dots) existing on the base layer and connecting them by imaginary lines (dotted lines). However, upon determining the pitch, the closed figure thus formed is formed such that no spacer is present therein. Therefore, for example, in the case where spacers are formed such that another spacer is present therein, as in FIG. 16, they are excluded when determining the pitch.

In one example, the ratio (%) of the number of sides having the same length among sides of a triangle, a quadrangle or a hexagon, which is a closed figure thus formed (100×(number of sides of the same length)/3 in the case of a triangle, 100×(number of sides of the same length)/4 in the case of a quadrangle, and 100×(number of sides of the same length)/6 in the case of a hexagon) can be 85% or less. In another example, the ratio may be 84% or less, 80% or less, 76% or less, 67% or less, 55% or less, or 40% or less. The lower limit of the ratio is not particularly limited. That is, in some cases, since the lengths of all sides of the closed figure may not be the same, the lower limit of the ratio may be 0%.

As described above, the arrangement of the spacers of the present application is irregular in that at least a part thereof has different pitches, but such irregularity is controlled under certain regularity. Here, the regularity may mean that the arrangement density of spacers is substantially close to each other between certain regions.

For example, if the normal pitch of the plurality of irregularly arranged spacers is P, when two or more square regions with 10P as a length of one side have been optionally selected on the surface of the base layer, the standard deviation of the number of spacers present in each square region is 2 or less.

FIG. 17 is a view exemplarily showing a case where four square regions (dotted rectangular regions) with 10P as the length of one side are optionally selected.

Here, the term normal pitch means a distance between the centers of adjacent spacers in a state where the plurality of spacers, in actuality, irregularly disposed on the base layer are placed so that all of the spacers are virtually disposed at the same pitch in consideration of the number of the spacers and the area of the base layer.

The manner to confirm a virtual state where all of the above-mentioned spacers are disposed so as to have the same pitch is known, which can be achieved by using a random number generating program such as, for example, CAD, MATLAB, STELLA or Excel.

In addition, the standard deviation is a numerical value representing a degree of scattering of the number of the spacers, which is a numerical value determined by a positive square root of dispersion.

That is, when at least two or more of the rectangular regions have been optionally designated on the surface of the base layer that spacers are formed thereon and then the standard deviation of the numbers of spacers existing in the regions has been obtained, the standard deviation is 2 or less. In another example, the standard deviation may be 1.5 or less, 1 or less, or 0.5 or less. In addition, the standard deviation means that the lower the numerical value is, the desired regularity is achieved, and thus the lower limit is not particularly limited, which may be 0, for example.

Also, here, the number of the designated rectangular regions is not particularly limited as long as it is 2 or more, but in one example, it may be selected as the number that the rectangular regions are optionally selected so as not to overlap each other on the surface of the base layer, provided that the area occupied by the optionally selected regions is about 10% or more, 20% or more, 30% or more, 40% or more, 50% or more, 60% or more, 70% or more, 80% or more, or 90% or more of the total area of the base layer.

Furthermore, the range of the normal pitch (P) forming one side of the arbitrary rectangular region can be determined by the number of spacers present on the base layer and the area of the relevant base layer, as described above, which is not particularly limited, and usually, it may be determined in a range of 100 μm to 1,000 μm.

Although not particularly limited, the average number of spacers present in optionally selected square regions as above may be, for example, about 80 to 150 or so. In another example, the average number may be 82 or more, 84 or more, 86 or more, 88 or more, 90 or more, 92 or more, 94 or more, 96 or more, or 98 or more. Also, in another example, the average number may be 148 or less, 146 or less, 144 or less, 142 or less, 140 or less, 138 or less, 136 or less, 134 or less, 132 or less, 130 or less, 128 or less, 126 or less, 124 or less, 122 or less, 120 or less, 118 or less, 116 or less, 114 or less, or 112 or less.

Also, the ratio (SD/A) the above-mentioned standard deviation (SD) to the average number (A) of the spacers may be 0.1 or less. In another example, the ratio may be 0.09 or less, 0.08 or less, 0.07 or less, 0.06 or less, 0.05 or less, 0.04 or less, or 0.03 or less.

The average number (A) or the ratio (SD/A) may be optionally changed, and for example, the numerical value may be changed in consideration of the transmittance, the cell gap and/or the uniformity of the cell gap required in the device to which the substrate is applied, and the like.

In another example, when the surface of the base layer on which the irregularly disposed spacers are formed has been divided into two or more regions having the same area, the standard deviation of the number of the spacers in each unit region may be 2 or less.

Here, the meaning of the standard deviation and the specific examples thereof are as described above.

That is, in the example, when the base layer has been divided into at least two regions having the same area and the standard deviation of the number of the spacers present in each divided unit region has been obtained, the standard deviation thereof is 2 or less. In this case, the shape of each divided unit region is not particularly limited as long as the relevant unit regions are divided so as to have the same area, but it may be, for example, a triangular, square, or hexagonal region. In addition, in another example, the standard deviation in the above state may be 1.5 or less, 1 or less, or 0.5 or less, and the lower limit thereof is not particularly limited, as described above, which may be 0, for example.

Here, the number of unit regions is not particularly limited, but in one example, the base layer may be divided into two or more, four or more, six or more, eight or more, or ten or more regions having the same area. Here, since it means that the higher the number of the divided regions, the more uniform the density of the spacers is maintained, the upper limit of the number of divided regions is not particularly limited.

When the virtual square region with P, which is a normal pitch, as one side has been selected on the substrate on which the plurality of spacers are disposed so as to have regularity and irregularity simultaneously, the average number of spacers existing in the relevant region may be in a range of 0 to 4. In another example, the average number may be 3.5 or less, 3 or less, 2.5 or less, 2 or less, or 1.5 or less. Also, in another example, the average number may be 0.5 or more. Here, the number of square regions of which the length of one side is optionally designated as the normal pitch (P) is not particularly limited as long as it is two or more, but in one example, it may be selected as the number that the square regions are optionally selected so as not to overlap each other on the surface of the base layer, provided that the area occupied by the optionally selected region is about 10% or more, 20% or more, 30% or more, 40% or more, 50% or more, 60% or more, 70% or more, 80% or more, or 90% or more of the total area of the base layer.

The entire density of the plurality of spacers can be adjusted so that the ratio of the area occupied by the spacers is about 50% or less relative to the total area of the base layer. In another example, the ratio may be about 45% or less, about 40% or less, about 35% or less, about 30% or less, about 25% or less, about 20% or less, about 15% or less, about 10% or less, about 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, or 1.5% or less. In another example, the ratio may be about 0.1% or more, 0.2% or more, 0.3% or more, 0.4% or more, 0.5% or more, 0.6% or more, 0.7% or more, 0.8% or more, 0.9% or more, or 0.95% or more.

When an optical device has been implemented by disposing a plurality of spacers on the base layer in the above form, the uniform optical characteristics can be ensured without causing the so-called more phenomenon, while the spacers maintain the uniform pitch (cell gap) between the substrates.

The respective numerical values may be changed, if necessary, and for example, the numerical values may be changed in consideration of the transmittance, the cell gap and/or the uniformity of the cell gap required in the device to which the substrate is applied, and the like.

The plurality of spacers may be arranged such that their spacing normal distribution diagram represents a predetermined shape.

Here, the spacing normal distribution diagram is a distribution diagram showing the pitch between the spacers as the X-axis and the ratio of the spacers having the relevant pitch among all the spacers as the Y-axis, where the ratio of the spacers is a ratio obtained when the number of the entire spacer has been 1.

An example of such a distribution diagram is shown in FIG. 18. In addition, the pitch in the description related to the spacing normal distribution diagram herein is a length of sides in a triangle, a quadrangle or a hexagon, which is the above-mentioned closed figure.

The distribution diagram can be obtained using a known random number coordinate program, for example, a CAD, MATLAB or STELLA random number coordinate program or the like.

In one example, the plurality of spacers may be disposed such that a half height area in the distribution diagram is in a range of 0.4 to 0.95. In another example, the half height area may be 0.6 or more, 0.7 or more, or 0.85 or more. Also, in another example, the half height area may be 0.9 or less, 0.85 or less, 0.8 or less, 0.75 or less, 0.7 or less, 0.65 or less, 0.6 or less, 0.55 or less, or 0.5 or less.

The plurality of spacers may be arranged such that a ratio (FWHM/Pm) of the half height width (FWHM) to the average pitch (Pm) in the distribution diagram is 1 or less. In another example, the ratio (FWHM/Pm) may be 0.05 or more, 0.1 or more, 0.11 or more, 0.12 or more, or 0.13 or more. Also, in another example, the ratio (FWHM/Pm) is about 0.95 or less, about 0.9 or less, about 0.85 or less, about 0.8 or less, about 0.75 or less, about 0.7 or less, about 0.65 or less, about 0.6 or less, about 0.55 or less, about 0.5 or less, about 0.45 or less, or about 0.4 or less.

When at least 80% or more, 85% or more, 90% or more, or 95% or more of spacers have been selected to form a triangle, quadrangle or hexagon, which is the above-described closed figure, the above-mentioned average pitch (Pm) is an average of the lengths of the respective sides of the triangle, quadrangle or hexagon formed by the selected spacers. Here, the spacers are also selected so that the formed triangles, quadrangles or hexagons do not share vertexes with respect to each other.

The plurality of spacers may be disposed such that the half height width (FWHM) in the distribution diagram is in a range of 0.5 μm to 1,000 μm. In another example, the half height width (FWHM) may be about 1 μm or more, 2 μm or more, 3 μm or more, 4 μm or more, m or more, 6 μm or more, 7 μm or more, 8 μm or more, 9 μm or more, 10 μm or more, 11 μm or more, 12 μm or more, 13 μm or more, 14 μm or more, 15 μm or more, 16 μm or more, 17 μm or more, 18 μm or more, 19 μm or more, 20 μm or more, 21 μm or more, 22 μm or more, 23 μm or more, or 24 μm or more. In another example, the half height width (FWHM) may be about 900 μm or less, 800 μm or less, 700 μm or less, 600 μm or less, 500 μm or less, 400 μm or less, 300 μm or less, 200 μm or less, 150 μm or less, 100 μm or less, 90 μm or less, 80 μm or less, 70 μm or less, 60 μm or less, 50 μm or less, 40 μm or less, or 30 μm or less.

The plurality of spacers may be disposed such that the maximum height ($f_{max}$) of the spacing normal distribution diagram is 0.006 or more and less than 1. In another example, the maximum height ($f_{max}$) may be about 0.007 or more, about 0.008 or more, about 0.009 or more, or about 0.0095 or more. Also, in another example, the maximum height ($f_{max}$) may be about 0.9 or less, about 0.8 or less, about 0.7 or less, about 0.6 or less, about 0.5 or less, about 0.4 or less, about 0.3 or less, about 0.2 or less, about 0.1 or less, about 0.09 or less, about 0.08 or less, about 0.07 or less, about 0.06 or less, about 0.05 or less, about 0.04 or less, about 0.03 or less, or about 0.02 or less.

When an optical device has been implemented by disposing a plurality of spacers on to have the spacing normal distribution diagram in such a form, the uniform optical characteristics can be ensured without causing the so-called more phenomenon, while the spacers maintain the uniform pitch (cell gap) between the substrates.

The concept of degree of irregularity is introduced for a plurality of spacers to be disposed so as to simultaneously have irregularity and regularity as above. Hereinafter, a method for designing the arrangement of the spacers having such a form will be described.

In order to achieve the arrangement of the spacers having the above-mentioned regularity and irregularity simultaneously, a step of starting from a normal arrangement state and relocating the spacers to have irregularity is performed.

Here, the normal arrangement state is a state where the plurality of spacers are disposed on the base layer such that a regular triangle, a square or a regular hexagon in which all sides have the same length can be formed. FIG. 19 is a state in which spacers are disposed to form the square as an example. The length P of one side of the square in this state may be equal to the above-mentioned normal pitch. In such an arrangement state, a circle region having a radius of a length proportional to the length P of one side is designated on the basis of a point where one spacer exists, and the program is set so that the one spacer can be randomly moved in the region. For example, FIG. 19 schematically shows a form in which the circle region having the radius of the length of 50% (0.5P) relative to the length P is set and the spacer moves to any point in the region. The above-described arrangement can be achieved by applying such a movement to spacers of at least 80% or more, 85% or more, 90% or more, 95% or more, or 100% (all spacers).

In such a design method, the ratio of the radius of the circle region to the length P may be defined as a degree of irregularity. For example, in the case shown in FIG. 19, the degree of irregularity is about 50%.

In one example, the degree of irregularity in the design manner may be about 5% or more, about 10% or more, about 15% or more, about 20% or more, about 25% or more, about 30% or more, about 35% or more, about 40% or more, about 45% or more, about 50% or more, about 55% or more, about 60% or more, or about 65% or more. In one example, the degree of irregularity may be about 95% or less, about 90% or less, about 85% or less, or about 80% or less.

The arrangement having the above-described irregularity and regularity simultaneously can be achieved by designing the arrangement of the spacers in the same manner as above and forming the spacers according to the designed arrangement.

Also, here, although the case where the normal state starts from the square has been exemplified, the normal state may be other figures such as a regular triangle or a regular hexagon, and in this case, the above-described arrangement can also be achieved.

Furthermore, the means for designing the arrangement of the spacers in the same manner as above is not particularly limited, and a known random number coordinate program such as, for example, a CAD, MATLAB, STELLA or Excel random number coordinate program can be used.

For example, after the arrangement of the spacers is first designed in the same manner as above, a mask having a pattern according to the relevant design and the like may be manufactured, and such spacers may be implemented by applying the relevant mask to the above-described lithography or imprinting method, and the like.

The present application also relates to an optical device formed using such a substrate.

An exemplary optical device of the present application may comprise the substrate and a second substrate disposed opposite to the substrate and maintaining a gap with the substrate by the spacers in the substrate.

In the optical device, a light modulation layer may be present in a gap between two substrates. In the present application, the term light modulation layer may include all known types of layers capable of changing at least one characteristic among characteristics such as polarization states, transmittance, color tones and reflectance of incident light depending on purposes.

For example, the light modulation layer is a layer comprising a liquid crystal material, which may be a liquid crystal layer switched between a diffusion mode and a transparent mode by on-off of a voltage, for example, a vertical electric field or a horizontal electric field, a liquid crystal layer switched between a transparent mode and a blocking mode, a liquid crystal layer switched between a transparent mode and a color mode, or a liquid crystal layer switched between color modes of different colors.

The light modulation layers capable of performing the actions as above, for example, liquid crystal layers, are variously known. As one exemplary light modulation layer, a liquid crystal layer used in a typical liquid crystal display can be used. In another example, the light modulation layer may also be various types of so-called guest host liquid crystal layers, polymer dispersed liquid crystal layers, pixel-isolated liquid crystal layers, suspended particle devices or electrochromic devices, and the like.

The polymer dispersed liquid crystal layer (PDLC) is a superordinate concept including a PILC (pixel isolated liquid crystal), a PDLC (polymer dispersed liquid crystal), a PNLC (polymer network liquid crystal) or a PSLC (polymer stabilized liquid crystal), and the like. The polymer dispersed liquid crystal layer (PDLC) may comprise, for example, a liquid crystal region containing a polymer network and a liquid crystal compound dispersed in a state of being phase-separated from the polymer network.

The implementation manner or form of the light modulation layer is not particularly limited, and any known method may be employed without any limitation depending on purposes.

In addition, the optical device may further comprise additional known functional layers, such as a polarizing layer, a hard coating layer and/or an antireflection layer, if necessary.

Advantageous Effects

The present application relates to a substrate on which a specific type spacer is formed, a substrate comprising an alignment film formed on the spacer, and an optical device using such a substrate. In the present application, by controlling the shape of the spacer formed on the substrate, even when the alignment film is formed on the top and the orientation treatment is performed, the uniform orientation treatment can be performed without any influence by the step or the like of the spacer, whereby a substrate or the like capable of providing a device having excellent optical performance can be provided.

MODE FOR INVENTION

Hereinafter, the present application will be specifically described by way of examples, but the scope of the present application is not limited by the following examples.

Example 1

An imprinting mask of the type as shown in FIG. 11 was produced, and spacers were produced using the same. According to the form shown in FIG. 11, the imprinting mask was produced by forming a concave portion (9011) on a PET (poly(ethylene terephthalate)) main body (901), forming a light-shielding layer (AlOxNy) (902) on the surface on which no concave portion (9011) was formed and then forming a release layer on the light-shielding layer (902) and the concave portions (9011). At this time, the concave portion was formed into a hemispherical shape having a width in a range of approximately 24 μm to 26 μm and approximately 9 μm to 10 μm or so. In addition, the concave portions were formed such that the arrangement of the spacers was such that the degree of irregularity described in FIG. 19 was about 70% or so.

A crystalline ITO (indium tin oxide) electrode layer was formed on a PC (polycarbonate) base layer (100 in FIG. 12), and a light-shielding layer was formed thereon with a known material. Subsequently, about 2 to 3 mL of a mixture (UV resin) of a conventional ultraviolet curable acrylate binder and an initiator used in production of a column spacer was dropped on the light-shielding layer of the base layer. Then, the dropped mixture was pressed with the imprinting mask, and ultraviolet rays were irradiated in a state where a laminate comprising the base layer, the electrode layer, the light-shielding layer, the UV resin layer and the imprinting mask layer was formed to cure the UV resin layer. Through such a process, the condensing effect of the lens by the concave pattern of the mask (900) can be obtained, thereby increasing the degree of curing of the cured portion.

Thereafter, the spacers were formed on the ITO electrode layer of the PC base layer and the light-shielding layer by removing (developing) the uncured UV resin layer (200) and removing (etching) the light-shielding layer at the portion where the uncured UV resin layer was removed.

FIG. 20 shows a photograph of a spacer manufactured in the above manner. The spacer shown in FIG. 20 had a height of about 10 µm and a width of about 25 µm in the hemispherical portion cross section, and a maximum curvature of about 80 $mm^{-1}$. Furthermore, the total height of the spacer was about 12 µm to 13 µm, and the width was about 25 µm.

A conventional polyimide rubbing alignment film was coated on the base layer, on which the spacers as shown in FIG. 20 were formed, and rubbed to form an alignment film.

FIG. 21 is a view of an alignment film formed on the spacers as above, where the width is about 29 µm and the height is about 11.5 µm.

Examples 2 to 6

Spacers were produced in the same manner as in Example 1, provided that 5 spacers having different total heights of the spacer were produced by controlling the degree of pressing of the imprinting mask.

FIG. 22 is spacers manufactured in the same manner as above, where three photographs from the upper left to the right are photographs of the spacers having the total heights of 9.5 µm (maximum curvature: about 105 $mm^{-1}$), 10 µm (maximum curvature: about 100 $mm^{-1}$) and 10.5 µm (maximum curvature: about 95 $mm^{-1}$), respectively and two photographs from the lower left to the right are photographs of the spacers having the total heights of 11 µm (maximum curvature: about 90 $mm^{-1}$) and 12 µm (maximum curvature: about 83 $mm^{-1}$), respectively.

Example 7 and Comparative Example 1

The performance was compared using the substrate produced in Example 1 on which the alignment film was formed and the substrate to which a ball spacer as the conventional spacer was applied. The other conditions of both are the same, except that the spacer produced in Example 1 and the ball spacer are used as the spacer, respectively.

Devices, in which light-shielding and light-transmission states were realized through electrical signals, were produced, respectively, by disposing the substrates that the spacers and the alignment films at the top were formed opposite to the other PC substrates and then injecting a liquid crystal compound and a dichroic dye therebetween. FIG. 23 is a result of evaluating light leakage in the light-shielding state when the substrate of Example 1 has been applied, and FIG. 24 is a result of evaluating light leakage of the device using the substrate to which the ball spacer has been applied (Comparative Example 1) in the light-shielding state. From FIGS. 23 and 24, it can be confirmed that the generation of light leakage is suppressed by the uniform orientation treatment in the case of the present example.

FIG. 25 shows the results of evaluating the initial transmittance, driving haze, contrast ratios and image visibility of the device (CS, Example 7) to which the substrate of Example 1 has been applied and the device (Ball, Comparative Example 1) to which the ball spacer has been applied, where it can be seen that the case of Example 7 shows better performance.

The invention claimed is:

1. A substrate, comprising:
   a base layer; and
   a plurality of spacers disposed on the base layer,
   wherein each spacer has a curved portion and a tapered portion,
   wherein the tapered portion is disposed between the curved portion and the base layer,
   wherein a cross section of the curved portion has at least one region having a curvature,
   wherein a center of curvature of the at least one region is inside the cross section of the curved portion,
   wherein a cross section of the tapered portion has a curved shape, wherein a center of curvature of the curved shape is outside the cross section of the tapered portion,
   wherein, when a normal pitch of the plurality of spacers is P, a standard deviation of the numbers of the spacers in a square region having sides of length 10P is 2 or less,
   wherein the plurality of spacers are arranged such that a distribution of pitches between adjacent spacers is represented by a spacing normal distribution diagram, wherein, pitches in the distribution are determined by selecting groups of four spacers in the plurality of spacers to form closed figures that are quadrangles, wherein the quadrangles do not share vertexes, each quadrangle having no other spacers therein, and no other spacers directly contact each quadrangle, wherein a ratio of a number of sides having the same length among sides of each quadrangle is 40% or less, and each length of a side being defined as a pitch which is included in the distribution of pitches,
   wherein the spacing normal distribution diagram is a normal distribution curve, and
   wherein, in the spacing normal distribution diagram, a pitch between adjacent spacers is represented on an x-axis of the diagram and a ratio of adjacent spacers having a given pitch is represented on the y-axis of the diagram, wherein a sum of all ratios of adjacent spacers having a given pitch is 1, wherein a full width at half maximum (FWHM) height of the spacing normal distribution diagram is 0.5 µm to 1000 µm and a maximum height of the spacing normal distribution diagram is less than 1.

2. The substrate according to claim 1, wherein the cross section of the curved portion has a maximum curvature of 2000 $mm^{-1}$ or less.

3. The substrate according to claim 1, wherein the cross section of the curved portion does not include a curvature of 0 $mm^{-1}$.

4. The substrate according to claim 1, wherein the curved portion has a height in a range of 1 µm to 20 µm.

5. The substrate according to claim 1, wherein the curved portion has a width in a range of 2 µm to 40 µm.

6. The substrate according to claim 1, wherein the spacer has a height in a range of 7 µm to 50 µm.

7. The substrate of claim 1, wherein the curved portion is a hemispherical portion.

8. A substrate, comprising:
a base layer;
a plurality of spacers disposed on the base layer; and
an alignment film disposed on the base layer and each spacer,
wherein the alignment film has a curved portion overlying the spacer and a region adjacent to the curved portion and contacting the base layer,
wherein a cross section of the curved portion has at least one region having a curvature,
wherein a center of curvature of the at least one region is inside the cross section of the curved portion,
wherein a cross section of the region adjacent to the curved portion has a curved shape, wherein a center of curvature of the curved shape is outside the cross section of the region adjacent to the curved portion,
wherein, when a normal pitch of the plurality of spacers is P, a standard deviation of the numbers of the spacers in a square region having sides of length 10P is 2 or less,
wherein the plurality of spacers are arranged such that a distribution of pitches between adjacent spacers is represented by a spacing normal distribution diagram, wherein, pitches in the distribution are determined by selecting groups of four spacers in the plurality of spacers to form closed figures that are quadrangles, wherein the quadrangles do not share vertexes, each quadrangle having no other spacers therein, and no other spacers directly contact each quadrangle, wherein a ratio of a number of sides having the same length among sides of each quadrangle is 40% or less, and each length of a side being defined as a pitch which is included in the distribution of pitches,
wherein the spacing normal distribution diagram is a normal distribution curve, and
wherein, in the spacing normal distribution diagram, a pitch between adjacent spacers is represented on an x-axis of the diagram and a ratio of adjacent spacers having a given pitch is represented on the y-axis of the diagram, wherein a sum of all ratios of adjacent spacers having a given pitch is 1, wherein a full width at half maximum (FWHM) height of the spacing normal distribution diagram is 0.5 μm to 1000 μm and a maximum height of the spacing normal distribution diagram is less than 1.

9. The substrate according to claim 8, wherein the cross section of the curved portion has a maximum curvature of 2000 mm$^{-1}$ or less.

10. The substrate according to claim 8, wherein the cross section of the curved portion does not include a curvature of 0 mm$^{-1}$.

11. The substrate according to claim 8, wherein the alignment film has a width in a range of 1 μm to 80 μm.

12. An optical device, comprising:
the substrate of claim 8; and
a second substrate disposed opposite to the substrate,
wherein a gap is maintained between the substrate and the second substrate by the spacer.

13. The optical device according to claim 12, wherein a liquid crystal material is present in the gap between the substrate and the second substrate.

14. An optical device, comprising:
the substrate of claim 1; and
a second substrate disposed opposite to the substrate,
wherein a gap is maintained between the substrate and the second substrate by the spacer.

* * * * *